Dec. 20, 1955  O. L. PATTERSON  2,728,037
TIME SELECTOR AND SERVO DEVICES
Filed July 1, 1952  3 Sheets-Sheet 1

INVENTOR.
OMAR L. PATTERSON
BY
ATTORNEYS

Dec. 20, 1955  O. L. PATTERSON  2,728,037
TIME SELECTOR AND SERVO DEVICES
Filed July 1, 1952  3 Sheets-Sheet 3

*INVENTOR.*
OMAR L. PATTERSON
BY
ATTORNEYS

United States Patent Office 2,728,037
Patented Dec. 20, 1955

2,728,037

TIME SELECTOR AND SERVO DEVICES

Omar L. Patterson, Media, Pa., assignor to Sun Oil Company, Philadelphia, Pa., a corporation of New Jersey Application July 1, 1952, Serial No. 296,583

9 Claims. (Cl. 318—28)

This invention relates to time selector and servo devices. The type of time selector device constituting the present invention is designed to give repetitive time interval indications to a high degree of accuracy. The servo devices to which the invention relates utilize such time selector devices.

This application is in part a continuation of my application Serial No. 130,270, filed November 30, 1949 for analog computer or analyzer.

In said prior application there is disclosed, particularly for use in an analog computer or analyzer, a time selector of high accuracy. Specifically, as disclosed therein, the time selector provides a sharp pulse of adjustable width, say from ½ microsecond to 4 microseconds, at a time, in a repetitive cycle of 4000 microseconds length, adjustable through a range from 1 to 3000 microseconds in the cycle with an accuracy of adjustment within one microsecond. The figures just given are by way of example only and the time selector circuit may be designed to give the same general type of results for quite different repetitive periods and corresponding accuracy. Certain aspects of the time selector circuit just referred to are claimed herein.

It is an object of the present invention to extend the range of timing of a time selector circuit of this same general type by automatic control of a gating pulse. In the case of the circuit described in said application, a gating pulse was produced under the control of a zero time signal and the delay of such pulse was accomplished through the use of a single shot multivibrator circuit providing an adjustable delay interval. The accuracy of determination of the delay constituted a limitation on the maximum delay of the sharp output pulse. In accordance with the present invention, the gating pulse is automatically adjusted with relation to the output pulse (remembering that both are cyclically repeated) so that once having established the relationship in the vicinity of zero time, the delay of the output pulse may be very greatly extended while still giving results to a very high degree of accuracy.

A further general object of the invention is the provision of a servo device which utilizes a pair of time selector devices. Using one of the time selector devices as a master, and another as the servo element, very small deviations from simultaneity of their output pulses are caused to effect automatic adjustment of the servo device to bring it into time delay correspondence with the master. Mechanical servo control is secured by reason of the fact that the delay of the output pulse of the master time selector is accurately linearly related to the angular position of a control element in the nature of a phase changer. A similar element controlling the time delay of the servo output may be driven by a motor controlled to the extent of the deviation of the output pulses from the two devices from simultaneity. Inasmuch as the device which shifts phase and thereby determines delay may be very light, and in fact no more than a condenser plate, simple drive of both the input and output can be effected with the expenditure of very little power and the mechanical motion of the adjustable member of the servo device can be translated into any desired power output through mechanical amplifying means. An accuracy of 0.02% at full scale range may be readily secured.

The foregoing objects and other objects relating particularly to details of construction and operation will become apparent from the following description read in conjunction with the accompanying drawings, in which.

Figure 1:
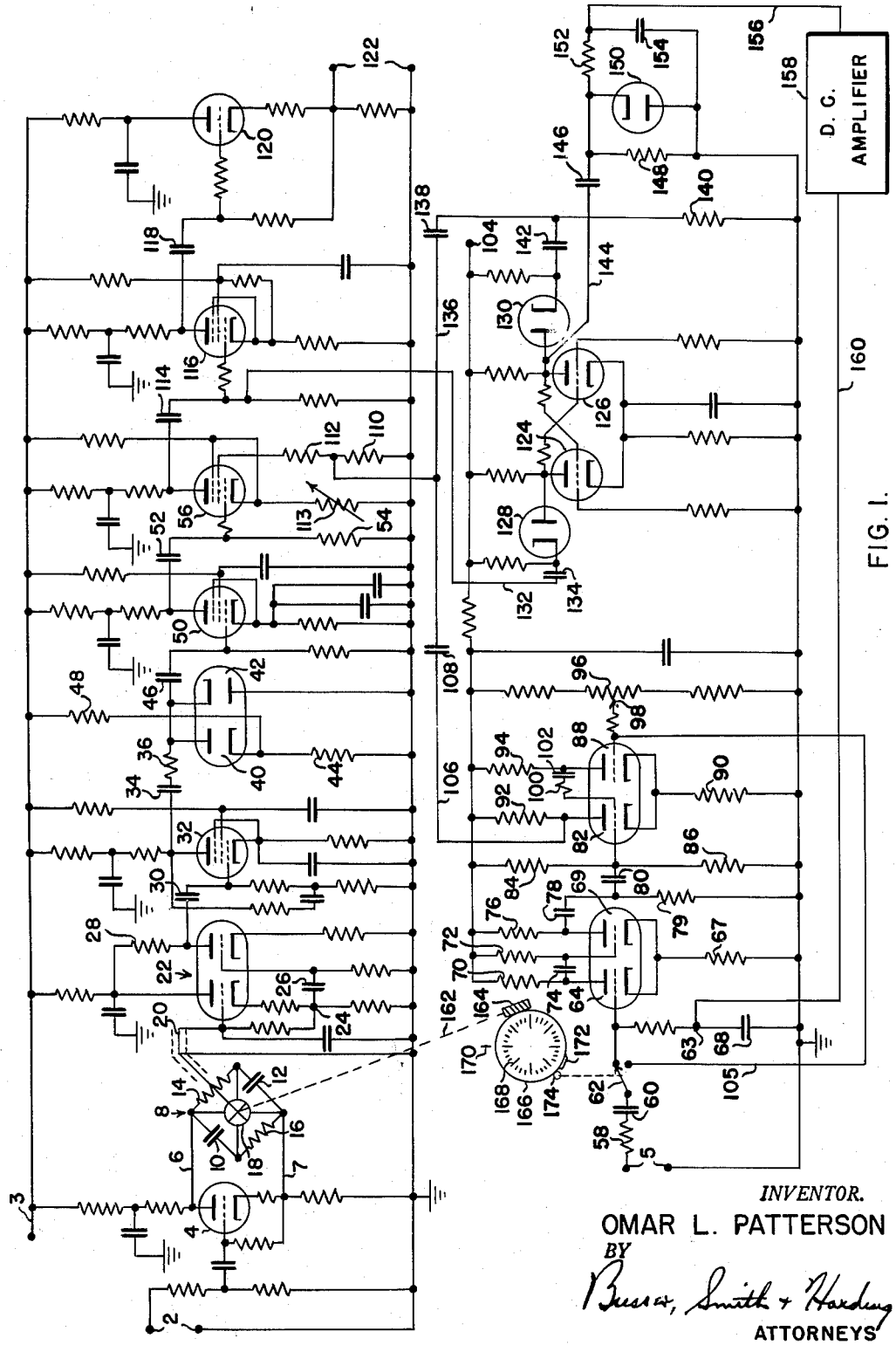
Figure 1 is a detailed wiring diagram of a preferred form of time selector circuit.

Considering first the time selector circuit of Figure 1, this circuit requires an input of a fixed frequency sine wave and an input of a sharp pulse at zero time of each of a series of repetitive cycles of operation. The pulse at zero time should be fixedly related to the phase of the alternating input sine wave. The production of both of these inputs may be effected by various known circuits but reference may be particularly made to the circuits described in my prior application which have been found particularly satisfactory for this purpose. For the sake of uniformity of description, reference will be made to intervals such as specifically described in said application, though it will be understood that intervals, frequencies and the like may be widely varied in accordance with the invention. Specifically it will be assumed that the alternating sine wave input has a frequency of 10 kilocycles and that the sharp pulse supplied at zero time is repeatedly produced at intervals of 4000 microseconds or at a frequency of 250 times per second. It will also be assumed that this zero time pulse is accurately fixed in phase relationship to the sine wave input, as provided for in the circuit described in said prior application. The zero time pulse may be assumed to have a duration of approximately 5 microseconds, though this duration is immaterial since the onset of the pulse is used to define zero time. Reference may now particularly be made to Figure 1.

The terminals 2, at which appear a sine wave at a frequency of 10 kilocycles per second from the supply, provide the input to an amplifier comprising a triode 4 having both anode and grid resistance networks and supplied with high voltage direct current from the line 3. The anode and grid circuits are connected through leads 6 and 7 to a phase shifter indicated generally at 8. This phase shifter comprises a bridge arrangement of a pair of fixed condensers 10 and 12 and a pair of fixed resistors 14 and 16 which arrangement supplies four quadrature phases of the 10 kilocycle wave to the fixed quadrature plates of a rotary phase shifting condenser indicated at 18 which is of a known type as described, for example, in Terman "Radio Engineer's Handbook," first edition, page 949. The arrangement is such that an output provided between the line 20 and ground at the frequency of 10 kilocycles is continuously variable in phase by rotation of the shaft of the condenser 18 with an accurately linear relationship between angular displacement of the shaft and phase angle, the phase being shifted 360° for a complete revolution of the condenser shaft. A calibrated dial carried by the shaft may then be used to indicate to a high degree of precision the shifted phase so that the zero of the wave may be adjusted to an accuracy of 1 microsecond through a period of 100 microseconds.

The output of the phase shifter is amplified through a conventional amplifier 22 comprising a pair of triodes, the point 24 of the cathode resistance arrangement of the first being coupled through the condenser 26 to the control grid of the second, with the output taken from the anode of the second provided with the load resistor 28. This output is delivered through condenser 30 to a second amplifier comprising the pentode 32 and conventional connections and thence through the condenser 34 to the square wave former comprising the diodes 40 and 42. The cathode of the former is connected to the high voltage supply line 3 through a resistor 48 and to ground through the resistor 44. The square wave output is delivered through condenser 46 to the control grid of a pentode 50 in a conventional amplifying circuit and the output of this amplifier is fed to a differentiating circuit comprising the condenser 52 and resistor 54. The junction of this condenser and resistor is connected to the control grid of a tube 56 functioning as a gate, the delivery of a pulse being controlled by an elongated pulse applied to the screen of this pentode and provided in the fashion now to be described.

The terminals 5 receive a short pulse at a repetition rate of 250 cycles per second and defining the zero of the time cycle, and provide an input through resistance 58, condenser 60 and a switch 62 to a gate pulse forming arrangement. The switch 62 has alternative upper and lower positions and, as will be described in detail hereafter, is at most times in the upper position the result of which position will be first outlined.

In my prior application referred to above, the delay of initiation of a gate pulse is controlled by means of a potentiometer the contact of which is geared to the shaft of the rotary phase shifting condenser 18 in such fashion that a complete rotation of the potentiometer contact effecting full range of operation occurs in correspondence with thirty turns of the phase shifting condenser. While such an arrangement has been found satisfactory to provide a delay of the gating pulse up to 3000 microseconds when the repetition period is 4000 microseconds, in accordance with the present improvements, the gating pulse is automatically controlled without the utilization of such a potentiometer. The switch 62, however, is controlled by a follower 174 of a cam 172 driven by a shaft geared down from the shaft 162 of condenser 18 through reduction gearing 164. The geared down shaft may also provide a reference scale 168 on a disc 166 for visual indication of the delay of the output pulse by reference to an index mark 170, the time selector device being of the so-called multiple scale type, i. e. the time being read by reference to both the scale 168 and a scale (not shown) carried by the condenser shaft 162.

The switch 62 in its upper position provides connection between the upper terminal 5 and the grid of a triode 64 which is associated with a second triode 69 in a single shot cathode-coupled multivibrator circuit. This circuit includes a common cathode resistor 67 for the two triodes, a resistor 70 connecting the anode of the triode 64 with a regulated high voltage line connected to terminal 104, a resistor 72 connecting the grid of the triode 69 with the high voltage line, a resistor 76 connecting the anode of triode 69 to the high voltage line, and a condenser 74 connecting the anode of triode 64 to the grid of triode 69. The action of this single shot multivibrator is fundamentally conventional and, in brief, takes place as follows:

The triode 69 is normally conducting as will be evident from the fact that its grid is connected to the high voltage positive line, the triode 64 being normally cut off. A positive pulse at the control grid of triode 64 will overcome its cathode bias, rendering it conductive and lowering its plate potential which in turn lowers the potential of the grid of triode 69 by virtue of the capacitive coupling 74. The drop in grid voltage of triode 69 results in a reduction of cathode voltage which in turn reduces the cathode bias on triode 64 rendering the latter more conductive. This process is cumulative until triode 64 is fully conducting, with a plate potential determined by the grid voltage at 63, and triode 69 is cut off. The sudden drop in plate potential of triode 64 is delivered to the grid of triode 69 driving this grid considerably below its cut-off value relative to the cathode. Condenser 74 then begins to charge toward the positive voltage supply through resistor 72 until the grid potential exceeds the cut-off value at which time the action is reversed and tube 69 becomes conductive again, cutting off tube 64 with a return to the initial state. The result is that a time, predetermined by the circuit constants and the potential at 63, elapses between the introduction of a pulse through terminals 65 and the return of the multivibrator to its initial condition. An elongated pulse is thus emitted to the condenser 78 from the anode of the triode 69, this pulse being differentiated by the differentiating network provided by condenser 78 and resistor 79. As will shortly appear a negative pulse resulting from differentiation of the end of this positive pulse is utilized.

The last mentioned negative pulse follows the onset of the pulse at the terminals 5 by a time delay which is approximately linearly related to the potential at junction 63. That this delay is adjustable will be clear from consideration of the fact that the attainment of the end of the multivibrator pulse is dependent upon the period of flow of current through the resistor 72 necessary to charge the condenser 74 to a potential exceeding that of the potential of the grid of triode 64 which varies with the changes of potential applied at 63. If the potential of the grid of triode 64 is high a relatively small degree of discharge of the condenser occurs and, consequently, the multivibrator pulse will be short; whereas if the potential is low the pulse will be correspondingly elongated. The circuit arrangement is such that the negative differentiated pulse which is emitted to the condenser 80 may be delayed up to, for example, 2955 microseconds in the case of the circuit having the specific characteristics described, or for a much longer time if desired.

The condenser 80 is connected to the junction of a pair of resistors 84 and 86 which are in series between the positive high voltage line and ground and this junction is further connected to the grid of a triode 82 associated with a triode 88 in a single shot multivibrator circuit. The cathodes of these triodes are connected together and through a resistor 90 to ground. The anodes of the two triodes are connected through resistors 92 and 94 to the positive supply line. The anode of triode 88 is connected to the grid of triode 82 through resistor 100 and condenser 102. The grid of triode 88 is connected to the contact 98 of a potentiometer 96 forming part of a resistance network between the positive high voltage line and ground.

The adjustment of this last mentioned multivibrator is such that the triode 82 is normally conducting and the triode 88 is normally cut off. A positive pulse arriving at the grid of triode 82 is without effect, this positive pulse occurring at zero time in the cycle. A negative pulse, on the other hand, will cut off triode 82 and will effect conduction of triode 88. Discharge of the condenser 102 will occur and the original circuits of the two triodes will only be restored when recharging occurs sufficient to raise the potential of the grid of triode 82 above the potential of the grid of triode 88. There will accordingly be produced at the anode of triode 82 a positive pulse which begins with a negative pulse applied to the grid of this triode and has a duration determined by the setting of the contact of potentiometer 96. This is set so that the duration of the positive pulse at the anode of triode 82 is approximately 90 microseconds.

Consideration may now be given to the lower position of the switch 62. Under this condition of the switch a positive pulse at the upper terminal 5 will be applied through connection 105 to the grid of triode 88 with precisely the same results in the multivibrator as are produced by the application of the negative pulse to the grid of triode 82. Accordingly, in this case the multivibrator will produce a 90 microsecond pulse at the anode of triode 82 beginning at zero time.

The 90 microsecond pulses provided in either fashion are delivered through connection 106 and condenser 108 to the junctions of resistors 112 and 110 connected between the screen of pentode 56 and ground. As will be described the 90 microsecond positive pulse applied to the screen will serve as a gate for the delivery of a coincident short pulse at the control grid of pentode 56 to provide a pulse through the condenser 114 to the control grid of pentode 116 which is in a conventional amplifying circuit. The output pulse width may be controlled to some extent through adjustment of the variable resistor 113 in the cathode circuit of the pentode 56. The output of the amplifier 116 is taken from its anode through condenser 118 to an output cathode follower circuit including the triode 120 with resulting delivery of a positive pulse at the output terminals 122.

Assuming, for the present, that the gating pulse will proceed along the time scale in such fashion as to coincide with the desired pulse appearing at the control grid of pentode 56 to provide the desired output pulse, it will now be shown that the positive pulse delivered at the upper output terminal 122 occurs only once in a complete 4000 microsecond cycle and may be very precisely timed in this cycle. Reference will be made to the diagram of Figure 2.

The time scale of this figure is shown in three portions, the first extending from zero time past 200 microseconds, the second showing the region in the vicinity of 3000 microseconds and the fourth showing the region in the vicinity of 4000 microseconds which is the zero of a subsequent time cycle having a repetition rate of 250 cycles per second.

At A there is indicated the repetition of the 5 microsecond pulse entering at terminals 65, the beginning of which always establishes the zero time for a cycle.

First, there will be considered, in connection with B, what occurs to provide the emission of a pulse at the terminals 122 at zero time. At this time the switch 62 will be in its lower position so that the positive pulse entering at upper terminal 5 will act directly on the grid of the triode 88. At B*b* there is indicated the positive 90 microsecond pulse emitted on the line 106 to the screen of the gate tube 56, this pulse beginning essentially at zero time. The pulses applied to the control grid of the pentode 56 are indicated at B*c*, the initial adjustments being such that when the shaft of the phase shifting condenser 18 is at zero position these pulses are at zero phase angle. As will be evident the coincidence of the two pulses applied to the pentode 56 will give rise to a pulse at zero time emitted at the terminals 122 as indicated at B*d*.

Assume now that by turning the shaft of condenser 18 the pulse phase is shifted, but the turning movement is not sufficient to throw the switch 62 to its upper position. The pulse emitted on the line 106 will be the same as before as indicated at C*b*. The pulses applied to the control grid of pentode 56 will be delayed in phase to a degree linearly proportional to the angle of rotation of the shaft of condenser 18. These pulses are indicated at C*c*. As will be evident the pulse emitted in each time cycle will again be determined by coincidence of the two pulses applied to gate pentode 56 so that the pulse emitted at terminals 122 will be as indicated at C*d* at a time phase of 40 microseconds.

If the shaft of the condenser 18 is further turned, for example, past the position causing a pulse delay of 50 microseconds, the cam on the shaft of the scale-carrying member 166 will effect the shift of the switch 62 to its upper position so that a somewhat different action will occur as indicated at D. The pulse applied at zero time at upper terminal 5 will now be delivered to the grid of triode 64 and, as has been described, will render triode 64 conductive and will cut off triode 69. The result is a positive pulse appearing at the anode of the triode 69 which will terminate after a predetermined delay as hereafter described. The pulse appearing at the anode of triode 69 is indicated at D*a*. As has been pointed out the rise of this pulse has no effect, giving rise to a positive pulse through the differentiating circuit to the grid of triode 82 which is normally conducting. At the termination of this pulse, however, a negative pulse is emitted cutting off the triode 82 for a period of 90 microseconds, causing a positive pulse of this length to be emitted on the line 106 as indicated at D*b*.

The phase of the pulses applied to the grid of pentode 56 is indicated at D*c* and it will be evident that the emitted pulse at 122 will be as indicated at D*d*, for example, at a time of 60 microseconds.

As will now become evident, the pulse indicated at D*b* must travel along the time scale at approximately the same rate at which the pulses at D*c* are displaced in phase. Adjustments are so made that the pulse such as D*b* will bracket the pulses D*c*.

In further explanation of the operation there are illustrated at E the conditions which arise when the shaft of condenser 18 makes one complete revolution corresponding to a 360° phase shift of the phase shifter output. At E*a* there is indicated the more elongated pulse appearing at the anode of triode 69. This produces a corresponding delay of initiation of the 90 microsecond pulse emitted on the line 106 indicated at E*b*. The 360° phase shift has now brought the pulses at E*c* to the same time positions as at B*c*, but it will now be seen that the emitted pulse indicated at E*d* will be emitted at the time 100 microseconds since only at this time is there coincidence of the pulses applied to the gate tube 56.

At F*a*, F*b*, F*c* and F*d* there are indicated the conditions of the pulses heretofore referred to when there is emitted a pulse at a time of 170 microseconds. It will be noted that the pulse F*b* continues to progress toward the right in substantial alignment with the shift of the pulses F*c*. This shift continues through the entire range of the apparatus until finally there occur the conditions indicated at G*a*, G*b*, G*c* and G*d* where there are illustrated the conditions giving rise to the emission of a pulse at the terminals 122 at the time 3000 microseconds. It will, of course, be evident that the range of 3000 microseconds delay is quite arbitrary and could be much greater with, of course, a corresponding increase of the period of the repetition cycle.

The use of the 90 microsecond pulse as a gate insures, first, that it will not effect the issue of more than one pulse in a cycle at the terminals 122 and, second, provides for the possibility of a reasonable departure from precise accuracy of tracking of the accurately timed pulses appearing at the control grid of tube 56 by the gating pulses applied to its screen. For example, as will be evident, at *b'* and *b"* of the group of curves G, the tracking may well involve either cumulative lead or lag which might cause the 90 microsecond pulse to appear finally in either of these positions or any intermediate positions. Thus, the accuracy of the timing of the delayed pulse becomes dependent almost solely on the accuracy of construction of the condenser 18 in providing linear conformity between its shaft movements and the phase angle of its output; in fact, slight departures from linearity may be taken care of by accurate calibration of the scale of this condenser even if a non-linear relationship exists.

It may be seen, in short, from what has been so far described that there may be produced, as the result of the circuit of Figure 1, at the upper output terminal 122 a positive pulse readily timed to an accuracy within 1 microsecond throughout a complete delay range of 3000 microseconds, assuming that tracking by the 90 microsecond gate pulse properly occurs. That this does occur will now be made evident.

As has been heretofore described, the potential at the point 63 determines the initiation of the 90 microsecond gating pulse. In the arrangement described in my prior application, the potential of an equivalent point is varied by means of a potentiometer driven through reduction gearing from the shaft of the phase shifting condenser 18. This arrangement is improved in the present circuit by providing automatic tracking which makes possible extension of the time delay and also insures that the 90 microsecond gate pulse does not become so advanced or retarded as to fail to provide the necessary gating action.

To accomplish this automatic tracking there is provided automatic adjustment for the potential at 63 in dependence upon the deviation of the 90 microsecond gating pulse from symmetry with respect to the output timed pulse. A pair of triodes 124 and 126 are arranged in a conventional bistable multivibrator circuit with the usual criss-cross connections of their anodes and grids. The usual input diodes 128 and 130 are provided. The cathode of the former is connected through line 132 and condenser 134 to the output from the anode of pentode 56 so that the cathode of this diode receives negative pulses in coincidence with the positive pulses emitted at terminals 122. The input to the screen of pentode 56 is connected through line 136 and condenser 138 to a resistor 140 and condenser 142, the latter being connected to the cathode of diode 130. Condenser 138 and resistor 140 provide a differentiating arrangement for the 90 microsecond gating pulse which appears on line 136. As a consequence a positive pulse appears at the cathode of diode 130 at the beginning of the gating pulse and a negative pulse appears at that cathode at the end of the gating pulse.

The output from the multivibrator is taken on line 144 through condenser 146 to the network comprising the resistor 148 connected to ground, the diode 150 having its anode connected to ground and its cathode connected to condenser 146, and the integrating arrangement of resistance 152 and condenser 154. The output from this integrating arrangement is delivered through connection 156 to a direct current amplifier 158 the output of which is connected by line 160 to terminal 63.

The operation of the arrangement just described is as follows:

Assuming that the apparatus is operating, when the 90 microsecond gating pulse begins in a particular cycle, the triode 126 will be conducting and the triode 124 will be cut off. At the initiation of the gating pulse a positive pulse will appear at the cathode of diode 130 but will have no effect on the multivibrator. Next, there will appear at the cathode of diode 128 a negative pulse coincident with the emission of the output pulse at 122. This negative pulse will trip the multivibrator to cut off triode 126 and render conducting the triode 124. Next, the cathode of diode 130 will receive a negative pulse at the end of the gating pulse. This will trip the multivibrator to restore it to its initial condition with triode 126 conducting and triode 124 cut off.

Figure 2:
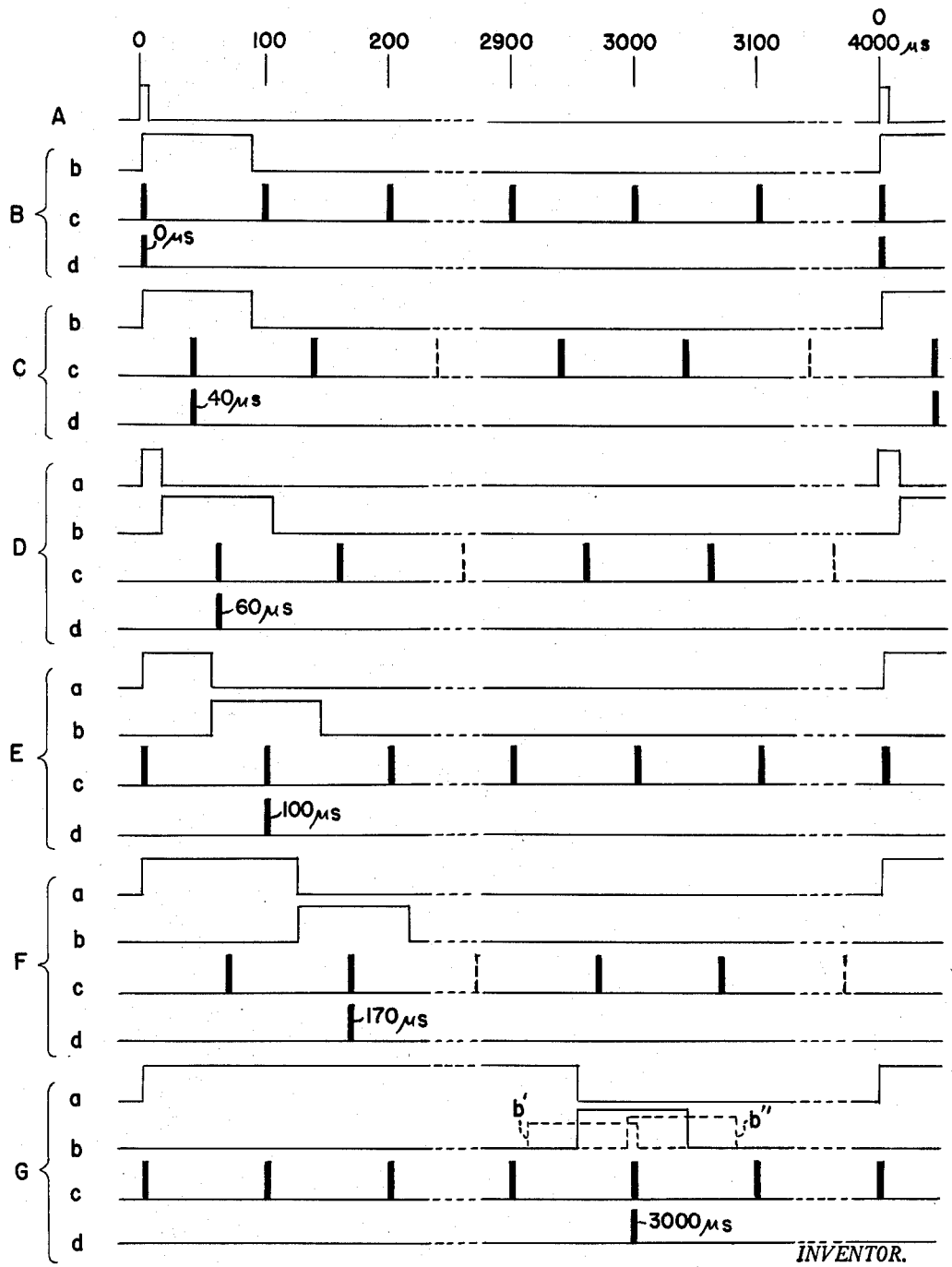
Figure 2 is a diagram explanatory of the operation of the time selector circuit.
Figure 3:
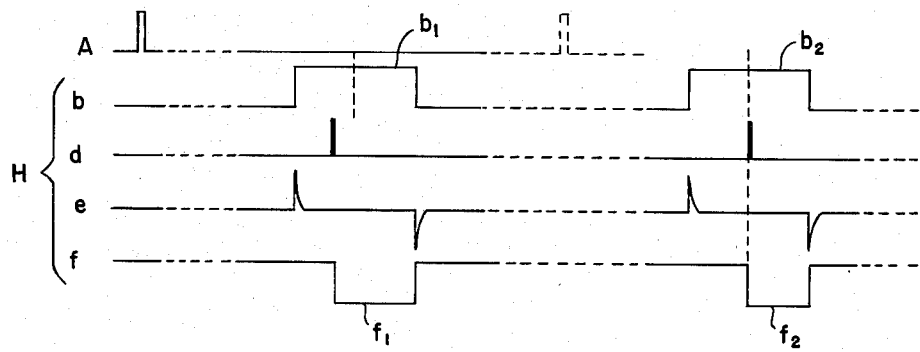
Figure 3 is a further diagram explanatory of the operation of the time selector circuit.

Reference may now be made to Figure 3 which shows at A the zero time initiating pulses of the repetitive cycles as in Figure 2. At H$b$ there is shown a 90 microsecond gating pulse $b_1$ having an asymmetric relationship to the output pulse corresponding thereto and indicated at H$d$. As shown, the gating pulse $b_1$ abnormally lags the output pulse.

At H$e$ there are indicated the positive and negative pulses produced by differentiation of the gate pulse. At H$f$ there is indicated the pulse $f_1$ appearing at the anode of triode 124 as the result of the multivibrator tripping actions just described. A corresponding but inverse pulse appears at the anode of triode 126.

It will be noted that the duration of the pulse $f_1$ is a measure of the asymmetry of the gating pulse with respect to the corresponding output pulse, the pulse $f_1$ becoming longer as the gating pulse lags the output pulse, and vice versa. Through the integrating network, the corresponding pulse from the anode of triode 126 is integrated and the output of the integrator is amplified through amplifier 158 and supplied to terminal 63 to change the potential of the condenser 68. Desirably, a low time constant is involved in the integrating arrangement 152, 154 so that the automatic control of the potential at terminal 63 is subject to sensitive response to changes in duration of the pulse appearing at the anode of triode 126. The amplifier stages are such that a corrective action on the potential at terminal 63 is secured, with the result that the condition of symmetry of the gating pulse with respect to the output pulse is secured as indicated at $b_2$ in Figure 3, the corresponding pulse at the anode of triode 124 being indicated at $f_2$ and representing a normal condition which will result in maintenance of the required fixed potential at terminal 63, it being noted that the integrating condenser 154 may discharge in the absence of a pulse through resistors 152 and 148 while condenser 68 may likewise discharge slowly through the output resistance of the amplifier 158.

Control in the fashion described, of course, requires that when the timing circuit is first put into operation it should be started with a zero time delay and then by adjustment of condenser 18 and its mechanically associated parts set for the time delay required. Under these conditions, the gating pulse will track the output pulse maintaining the desired relationship throughout an extremely extended range of operation.

While for simplicity of description it has been indicated that the desirable condition is symmetry of the gating pulse with respect to the output pulse, that condition is unnecessary, and, furthermore, it is simpler, and imposes less requirements on the amplifier 158, if through the desired range of operation the automatic control is so adjusted that the relationship of the gating pulse to the output pulse changes through the range, with the output pulse near one end of the gating pulse at the region near zero of the range and near the other end, though within, the gating pulse near the extreme range. This, it will be noted, is similar in its aspects to what has been described with reference to the gating pulses $b'$ and $b''$ in Figure 2. All that is required for automatic tracking is that throughout the range of the system the gating pulse should properly bracket the desired output pulse. Of course, if instabilities or drifts appear in the circuit it is desirable to maintain more nearly a condition of symmetry or a condition such that if the instabilities or drifts cause a relative shift of the pulses in one direction so that such shifts do not involve the possibility of non-coincidence of the gating pulse and the desired output pulse.

Figure 4:
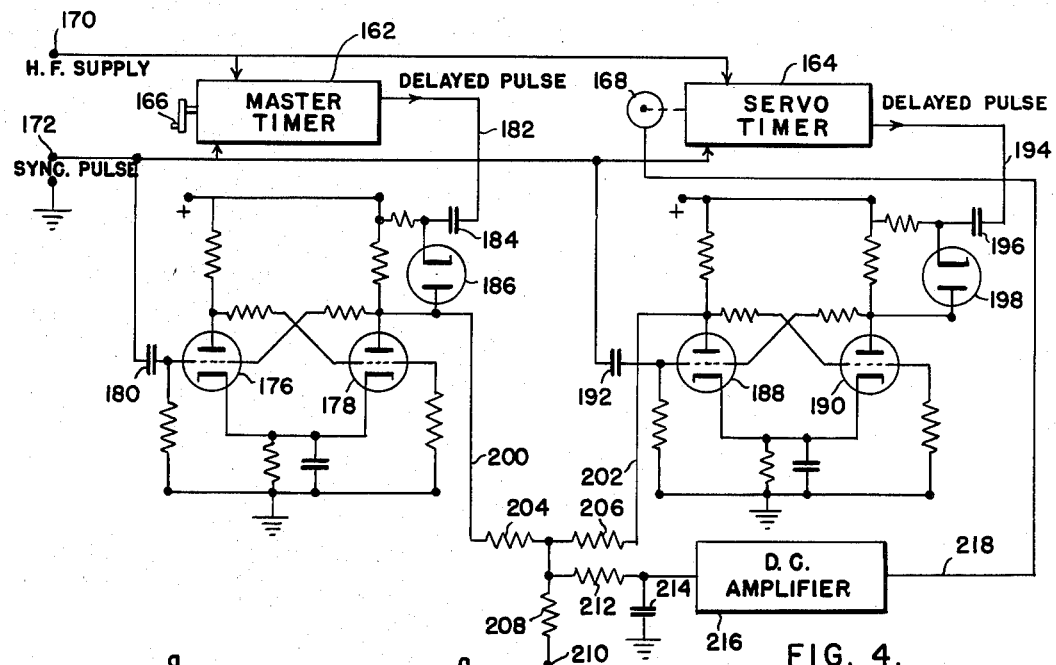
Figure 4 is a wiring diagram illustrating the utilization of a pair of time selector devices to provide a servo system.

Figure 4 illustrates the utilization of a pair of timers of the type described to provide a servo mechanism. Essentially this involves the automatic control of the time delay of a servo timer to bring into coincidence its output pulse and the output pulse of a master timer serving as a transmitter.

A master timer 162 and a servo timer 164 are of the type described, though, if desired, they may be of the type which does not involve automatic tracking control of a gating pulse as in the circuit described in my prior application referred to above. The displacement input to the master timer 162 is conventionalized as a crank 166 which is connected to the shaft of the phase shifting condenser 18 of that timer. The condenser shaft may, of course, be connected to any driving device the position of which is to serve for control. It may be noted, however, that since it is required only to impart motion to condenser plates and possibly a switch-controlling mechanism, the input to the master timer involves very little energy requirement. In fact, as will be evident, if it is not required that the range be down to zero, there is no necessity for a control of a switch such as 62.

The mechanical input to the servo timer 164 is through a motor 168 which may likewise be very small inasmuch as it need only drive the plates of a condenser, or possibly, in addition, a switch. The two timers have a common high frequency supply from terminal 170 and likewise are fed with the same synchronizing pulse from terminal 172. These respective inputs correspond to those at terminals 2 and 5 of Figure 1.

Associated with the master timer 162 is a bistable multivibrator comprising the triodes 176 and 178 in a conventional circuit with criss-cross connections of their anodes and grids. The grid of triode 176 is connected through condenser 180 to the synchronizing pulse line. A line 182 supplies the output of the master timer through condenser 184 and diode 186 to the grid of triode 176. Since a negative output pulse is here desired, the connection 182 may be to the anode of pentode 56 of the master timer rather than to the output terminal 122 thereof.

A similar multivibrator is associated with the servo timer 164 and comprises triodes 188 and 190 in the same type of circuit as involves the triodes 176 and 178. The grid of triode 188 is connected through condenser 192 to the synchronizing pulse line. The output, furnishing a negative output pulse, from the servo timer 164 is connected at 194 through condenser 196 and diode 198 to the control grid of triode 188.

The anode of triode 178 is connected at 200 to a terminal of a resistor 204, while the anode of triode 188 is connected at 202 to the terminal of a resistor 206, the other terminals of these two resistors being joined. This junction is connected through a third resistor 208 to a negative potential supply terminal 210. The junction is also connected through a resistor 212 to the input of a direct current amplifier 216, the input being connected to ground through a condenser 214 which, with resistor 212, provides an integrating circuit. The output of the amplifier 216 is delivered through line 218 to the motor 168 which is of a suitable type, for example having a permanent magnet field, so as to be reversible with the sign of the output of the amplifier. Numerous arrangements may be here involved for securing reversal of the motor 168 in dependence upon the sign of the input to the amplifier. The operation involved is the following:

In the case of the multivibrator associated with the master timer, the triode 178 is conducting prior to reception of the synchronizing pulse while the triode 176 is non-conducting. The synchronizing pulse provides a positive pulse to the grid of triode 176 which triggers the multivibrator to its alternate state with triode 176 conducting and triode 178 cut off. Accordingly, there will be a rise of potential at the anode of triode 178 at zero time. The delayed pulse from the master timer delivered at 182 triggers the multivibrator to its alternate state with triode 176 cut off the triode 178 conducting. The potential of its anode then drops, the result being that between zero time and the time of the delayed pulse, the anode of triode 178 has a positive potential pulse indicated at $g_1$ in Figure 5.

Figure 5:
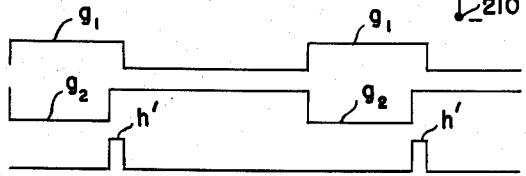
Figures 5 and 6 are diagrams explanatory of the operation of the servo system of Figure 4.

The multivibrator associated with the servo timer is similarly tripped, and the potential at the anode of triode 188 drops at zero time and rises at the time of the delayed pulse from the servo timer, giving rise to a pulse indicated at $g_2$ in Figure 5. The pulses $g_1$ and $g_2$ are respectively applied to the unjoined terminals of the resistors 204 and 206. If the servo timer is not in synchronism with the master timer, there will then appear a net positive or negative pulse at the input to the resistor 212. In Figure 5, for example, the assumption is that the delayed pulse from the servo timer precedes the delayed pulse from the master timer. The result is the appearance, between the times of these pulses, of a positive pulse $h'$ at the input to resistor 212. Such pulses repetitively occur during successive cycles and are integrated at condenser 214 and provide an input to the amplifier 216 which in turn causes a rotation of motor 168 in such direction as to further delay the pulse of the output of the servo timer.

Figure 6:
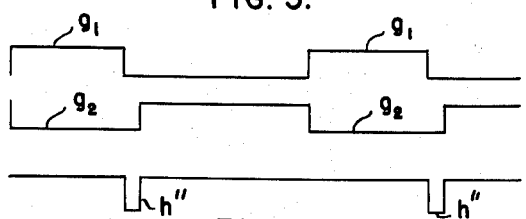

If, on the other hand, conditions are as indicated in Figure 6, in which the output pulse from the servo timer lags the output pulse from the master timer, there will be produced as a result at the input to resistor 212 a series of negative pulses $h''$ which will be integrated and through the amplifier 216 will cause a rotation of motor 168 in the opposite direction.

It will be evident that with sufficient amplification, the apparatus is such that equilibrium will be attained only when no pulses such as $h'$ or $h''$ are provided, this absence of pulses corresponding to coincidence of the delayed pulses from the master and servo timers. With a high cycle repetition rate and a high degree of amplification it will be evident that very rapid response of the servo timer to the master timer may be secured as well as precise correspondence of the two timers, reflected in accurately corresponding positions of the condenser shafts. It will, of course, be evident that through mechanical or other amplification the position of the servo timer input shaft may be accurately followed by a power shaft with the result that a transmission of sufficient power for any desired purpose may be secured. An accuracy of 1% in a single revolution of the condenser shaft may be readily secured, and by reason of the extended range possible for the timers the accuracy may readily be increased to a value such as 0.02% for the full range.

It may be noted that the gating pulse of the servo timer may be taken from the master timer so that the elements of Figure 1 relating to formation and tracking of the gating pulse may be omitted from the servo timer, resulting in simplification of its circuit. This assumes, of course, that the servo timer is always nearly in correspondence with the master timer, an assumption which in most applications is justified.

While reference has been particularly made to the use of timers of the type described in detail, it will be obvious that the invention may involve the use of other timers which may be of much simpler types, particularly when high accuracy is not required. They may, for example, be of the simple types using the charging or discharging of condensers through resistances. Linearity is not required provided that the master and servo timers of a pair have similar characteristics and are stable. The invention accordingly is not to be regarded as limited except by the scopes of the following claims.

What is claimed is:

1. A timing device comprising means providing zero time pulses at equal time intervals determining repetition cycles, means providing a sinusoidal signal having a frequency which is a predetermined multiple of the frequency of said cycles, a phase shifter supplied by said signal and providing an output bearing an adjustable phase relationship to said signal, means receiving said output and providing multiple pulses of short duration in each repetition cycle at the frequency of said signal and bearing a predetermined phase relationship to said signal in accordance with adjustment of said phase shifter, means providing an extended gate pulse during each of said repetition cycles, means for varying the phase of occurrence of said gate pulses during said repetition cycles, and means providing an output pulse at the time of coincidence of each gate pulse with one of said multiple pulses, said means for varying the phase of occurrence of said gate pulse being controlled in accordance with the time relationship of the gate pulse with respect to its coincident one of said multiple pulses.

2. A timing device comprising means determining repetition cycles, means providing multiple pulses of short duration in each repetition cycle at a frequency which is a predetermined multiple of the frequency of said repetition cycles, means for shifting the phase relationships of said multiple pulses to said repetition cycles, means providing an extended gate pulse during each of said repetition cycles, means for varying the phase of occurrence of said gate pulses during said repetition cycles, and means providing an output pulse at the time of coincidence of each gate pulse with one of said multiple pulses, said means for varying the phase of occurrence of said gate pulse being controlled in accordance with the time relationship of the gate pulse with respect to its coincident one of said multiple pulses.

3. A timing device comprising means determining repetition cycles, means providing multiple pulses of short duration in each repetition cycle at a frequency which is a predetermined multiple of the frequency of said repetition cycles, means for shifting the phase relationships of said multiple pulses to said repetition cycles, means providing an extended gate pulse during each of said repetition cycles, means for varying the phase of occurrence of said gate pulses during said repetition cycles, and means providing an output pulse at the time of coincidence of each gate pulse with one of said multiple pulses, said means for varying the phase of occurrence of said gate pulse being controlled in accordance with the time relationship of the gate pulse with respect to its coincident one of said multiple pulses and comprising an astable multivibrator having the duration of its astable state dependent upon said time relationship and controlling by its return to its stable state the initiation of said gate pulse.

4. A timing device comprising means determining repetition cycles, means providing multiple pulses of short duration in each repetition cycle at a frequency which is a predetermined multiple of the frequency of said repetition cycles, means for shifting the phase relationships of said multiple pulses to said repetition cycles, means providing an extended gate pulse during each of said repetition cycles, means for varying the phase of occurrence of said gate pulses during said repetition cycles, and means providing an output pulse at the time of coincidence of each gate pulse with one of said multiple pulses, said means for varying the phase of occurrence of said gate pulse comprising an astable multivibrator having the duration of its astable state dependent upon said time relationship and controlling by its return to its stable state the initiation of said gate pulse.

5. A timing device comprising means determining repetition cycles, means providing multiple pulses of short duration in each repetition cycle at a frequency which is a predetermined multiple of the frequency of said repetition cycles, means for shifting the phase relationships of said multiple pulses to said repetition cycles, means providing an extended gate pulse during each of said repetition cycles, each gate pulse having a duration less than the period of recurrence of said multiple pulses, means for varying the phase of occurrence of said gate pulses during said repetition cycles, and means providing an output pulse at the time of coincidence of each gate pulse with one of said multiple pulses, said means for varying the phase of occurrence of said gate pulse comprising an astable multivibrator having the duration of its astable state dependent upon said time relationship and controlling by its return to its stable state the initiation of said gate pulse.

6. A servo mechanism comprising a master timer, a servo timer, each of said timers providing an output pulse in each of a series of repetition cycles, each of said timers having a mechanical input device adjustable to determine the time of occurrence of its output pulse in each repetition cycle, and means responsive to the time relationship of the output pulses of the respective timers to control movement of the mechanical input device of the servo timer in the direction to attain coincidence of the output pulses from the timers.

7. A servo mechanism comprising a master timer, a servo timer, each of said timers being of multiple scale type and providing an output pulse in each of a series of repetition cycles, each of said timers having a mechanical input device adjustable to determine the time of occurrence of its output pulse in each repetition cycle, and means responsive to the time relationship of the output pulses of the respective timers to control movement of the mechanical input device of the servo timer in the direction to attain coincidence of the output pulses from the timers.

8. A servo mechanism comprising a master timer, a servo timer, each of said timers providing an output pulse in each of a series of repetition cycles, each of said timers having a mechanical input device including a phase shifting condenser adjustable to determine the time of occurrence of its output pulse in each repetition cycle, and means responsive to the time relationship of the output pulses of the respective timers to control movement of the mechanical input device of the servo timer in the direction to attain coincidence of the output pulses from the timers.

9. A servo mechanism comprising a master timer, a servo timer, each of said timers being of multiple scale type and providing an output pulse in each of a series of repetition cycles, each of said timers having a mechanical input device including a phase shifting condenser adjustable to determine the time of occurrence of its output pulse in each repetition cycle, and means responsive to the time relationship of the output pulses of the respective timers to control movement of the mechanical input device of the servo timer in the direction to attain coincidence of the output pulses from the timers.

References Cited in the file of this patent

UNITED STATES PATENTS

| | | |
|---|---|---|
| 2,422,204 | Meacham | June 17, 1947 |
| 2,466,044 | Schoenfeld | Apr. 5, 1949 |
| 2,516,765 | Ferrell | July 25, 1950 |
| 2,538,027 | Mozley et al. | Jan. 16, 1951 |
| 2,563,902 | Yost | Aug. 14, 1951 |
| 2,577,536 | MacNichol, Jr. | Dec. 4, 1951 |
| 2,685,054 | Brenner et al. | July 27, 1954 |

FOREIGN PATENTS

| | | |
|---|---|---|
| 582,492 | Great Britain | Nov. 19, 1946 |
| 588,187 | Great Britain | May 16, 1947 |